(12) United States Patent
Demme et al.

(10) Patent No.: US 11,250,216 B2
(45) Date of Patent: Feb. 15, 2022

(54) MULTIPLE PARALLEL DELINEATED TOPICS OF A CONVERSATION WITHIN THE SAME VIRTUAL ASSISTANT

(71) Applicant: International Business Machines Corporation, Armonk, NY (US)

(72) Inventors: Danielle Marie Demme, Pittsburgh, PA (US); Thomas Lynden Roach, Austin, TX (US); Christopher Desmarais, Austin, TX (US); Blake McGregor, New York, NY (US); Ethan James Winters, Somerville, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 16/541,224

(22) Filed: Aug. 15, 2019

(65) Prior Publication Data
US 2021/0049237 A1    Feb. 18, 2021

(51) Int. Cl.
*G10L 15/22* (2006.01)
*G06F 40/30* (2020.01)
*H04L 12/58* (2006.01)
*G06F 9/48* (2006.01)
*G06F 3/0482* (2013.01)
(Continued)

(52) U.S. Cl.
CPC ............ *G06F 40/30* (2020.01); *G06F 9/485* (2013.01); *H04L 51/02* (2013.01); *H04L 51/16* (2013.01); *G06F 3/0482* (2013.01); *G06F 40/35* (2020.01); *G10L 15/183* (2013.01); *G10L 15/22* (2013.01); *G10L 15/222* (2013.01);
(Continued)

(58) Field of Classification Search
None
See application file for complete search history.

(56) References Cited

U.S. PATENT DOCUMENTS 6,574,624 B1  6/2003  Johnson et al.
9,172,747 B2  10/2015  Walters et al.
(Continued)

FOREIGN PATENT DOCUMENTS

CN    104008160 A2    8/2014

OTHER PUBLICATIONS

Peter Mell et al., "The NIST Definition of Cloud Computing", NIST US Department of Commerece, Special Publication 800-145, Computer Security, 2011, 7 pages.

*Primary Examiner* — Richard Z Zhu
(74) *Attorney, Agent, or Firm* — Cantor Colburn LLP; David Mattheis

(57) ABSTRACT

Provided are embodiments for a computer-implemented method for interacting with a user by an automated response system supporting topic switching and information collection. The computer-implemented method includes receiving a plurality of utterances from the user by the automated response system, and analyzing the utterances to form a first topic thread and an information collection objective. The computer-implemented method also includes utilizing an information collection user interface to gather data to support the information collection objective, and providing responses to the user after the gathered data related to the first topic thread. Also provided are embodiments for a system and computer program product for implementing the techniques described herein.

16 Claims, 13 Drawing Sheets

(51) Int. Cl.
    *G10L 15/183*        (2013.01)
    *G10L 15/06*         (2013.01)
    *G06F 40/35*         (2020.01)

(52) U.S. Cl.
    CPC ................ *G10L 2015/0638* (2013.01); *G10L 2015/221* (2013.01); *G10L 2015/225* (2013.01)

(56) References Cited

U.S. PATENT DOCUMENTS

| | | | |
|---|---|---|---|
| 9,922,642 B2* | 3/2018 | Pitschel | G10L 15/063 |
| 10,269,351 B2* | 4/2019 | Aggarwal | G06F 3/04842 |
| 11,087,753 B2* | 8/2021 | Yoshida | G06F 16/33 |
| 2001/0021909 A1* | 9/2001 | Shimomura | G10L 15/22 |
| | | | 704/275 |
| 2016/0042735 A1* | 2/2016 | Vibbert | G10L 15/222 |
| | | | 704/257 |
| 2017/0316777 A1* | 11/2017 | Perez | G06F 40/169 |
| 2019/0057698 A1* | 2/2019 | Raanani | H04M 3/22 |
| 2019/0180743 A1* | 6/2019 | Yoshida | G06F 16/33 |
| 2020/0175961 A1* | 6/2020 | Thomson | G10L 15/063 |
| 2021/0203623 A1* | 7/2021 | Zhou | G06F 16/3329 |

* cited by examiner

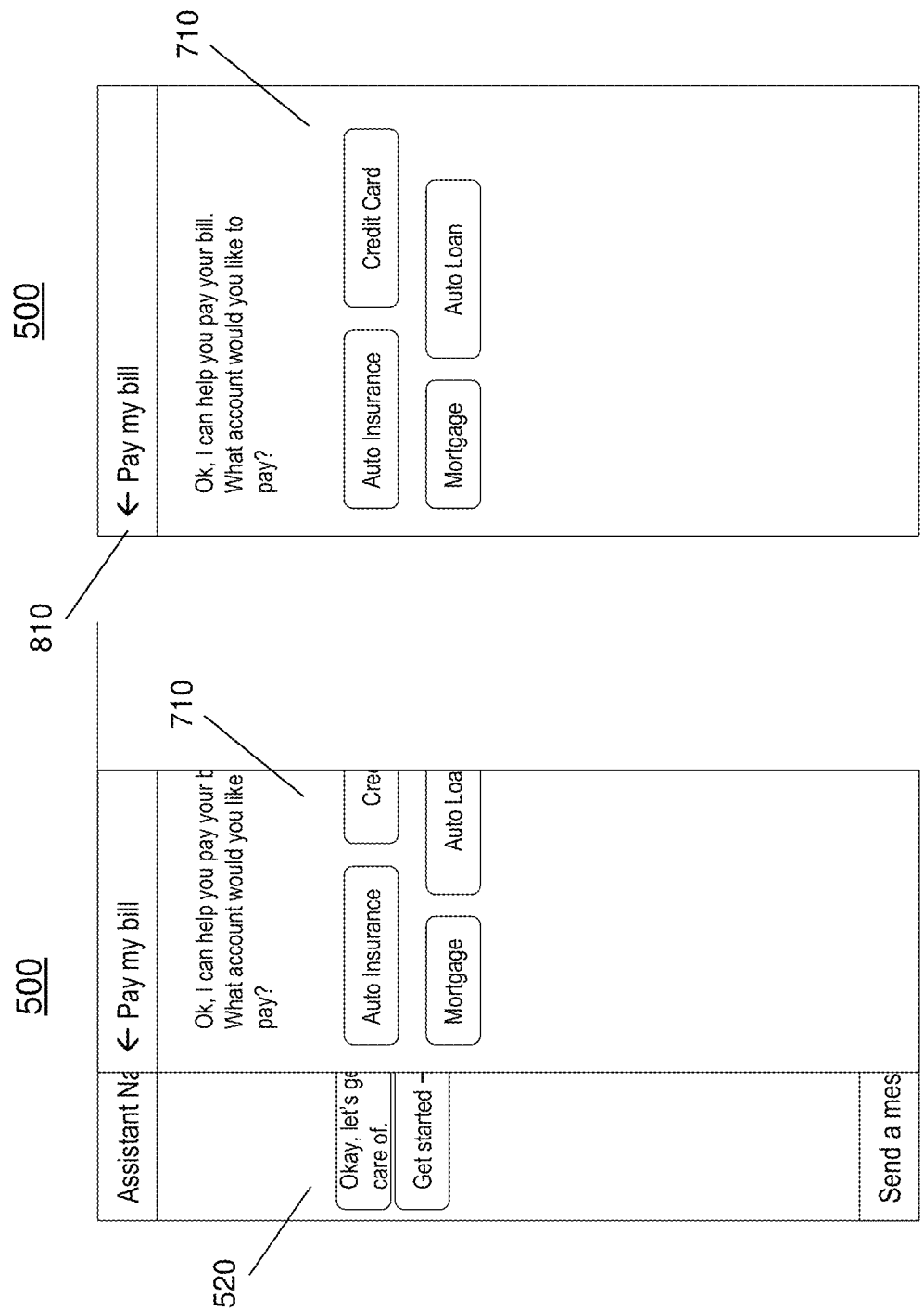

Assistant N | ← Pay my bill

Ok, I can help you pay your b...
What account would you like pay?

710

- Auto Insurance
- Cre[dit]
- Mortgage
- Auto Loa[n]

520 —
- Okay, let's care of...
- Get started...
- CVV
- Send a mes[sage]

← Pay my bill

I can help you pay your credit card bill just to confirm it's you, can you please provide the CVV on your card?

710

CVV Number

[ 123 ]  ← 910

*Please Enter*

← Pay my bill

Thanks! That matched your account. How much of your balance would you like to pay?

Amount

Payment Due  $50.35

Total Balance  $1011.92

Other Amount $  0.00

Next

← Pay my bill

Next

710

What day would you like to schedule the payment for?

Other Amount mm/dd/yyyy

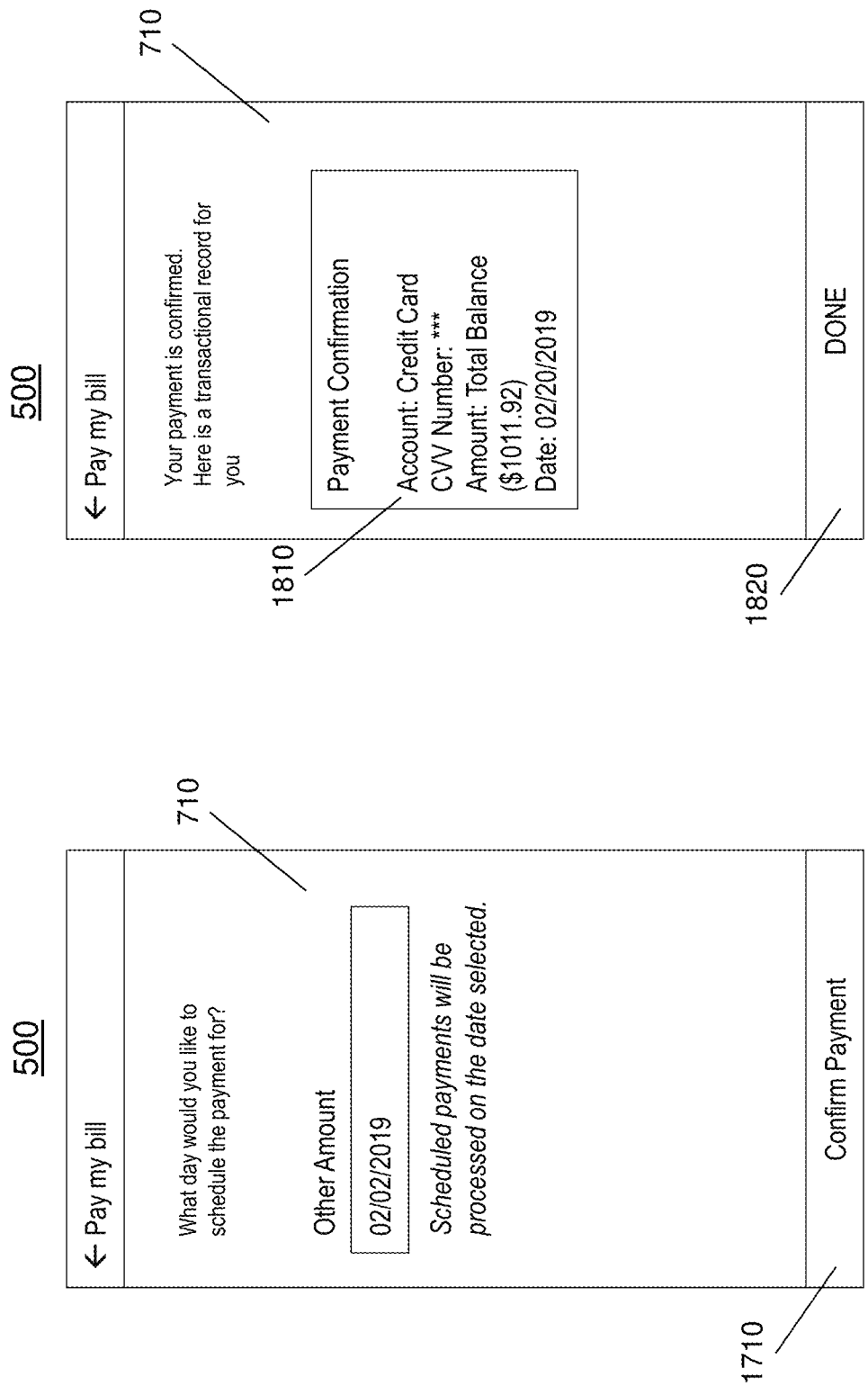

MULTIPLE PARALLEL DELINEATED TOPICS OF A CONVERSATION WITHIN THE SAME VIRTUAL ASSISTANT

BACKGROUND

The present invention generally relates to virtual assistants, and more specifically, to providing capabilities for simultaneous multi-threaded parallel conversations within the same virtual assistant.

In today's environment, many applications offer virtual assistants to obtain information or facilitate a transaction such as entering billing information or obtaining some type of customer service. The virtual assistant can include audio prompts over a phone conversation or text prompts over a chat session. Oftentimes, the virtual assistant is limited in responding to a number of responses. In some instances, the options that are provided by the virtual assistants are unclear or not directed towards the user's request. In these situations, the users are forced to make a selection from the limited options in hopes of eventually arriving at the correct menu or options. There may be a need to provide additional options to the user.

SUMMARY

Embodiments of the present invention are directed to a computer-implemented method for operating a virtual assistant. A non-limiting example of the computer-implemented method includes receiving a plurality of utterances from the user by the automated response system; analyzing the utterances to form a first topic thread and an information collection objective; utilizing an information collection user interface to gather data to support the information collection objective; and providing responses to the user after the gathered data related to the first topic thread.

Embodiments of the present invention are directed to a system for interacting with a user by an automated response system supporting topic switching and information collection. A non-limiting example of the system includes a user interface and a storage medium, the storage medium being coupled to a processor. The processor is configured to receive a plurality of utterances from the user by the automated response system; analyze the utterances to form a first topic thread and an information collection objective; utilize an information collection user interface to gather data to support the information collection objective; and provide responses to the user after the gathered data related to the first topic thread.

Embodiments of the invention are directed to a computer program product for operating a virtual assistant, the computer program product comprising a computer-readable storage medium having program instructions embodied therewith. The program instructions are executable by a processor to cause the processor to perform a method. A non-limiting example of the method includes receiving a plurality of utterances from the user by the automated response system; analyzing the utterances to form a first topic thread and an information collection objective; utilizing an information collection user interface to gather data to support the information collection objective; and providing responses to the user after the gathered data related to the first topic thread.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts a display in accordance with one or more embodiments of the invention;

FIG. 8 depicts a display in accordance with one or more embodiments of the invention;

FIG. 13 depicts a display in accordance with one or more embodiments of the invention;

FIG. 14 depicts a display in accordance with one or more embodiments of the invention;

FIG. 15 depicts a display in accordance with one or more embodiments of the invention;

FIG. 16 depicts a display in accordance with one or more embodiments of the invention;

FIG. 17 depicts a display in accordance with one or more embodiments of the invention;

FIG. 18 depicts a display in accordance with one or more embodiments of the invention;

Figure 1:
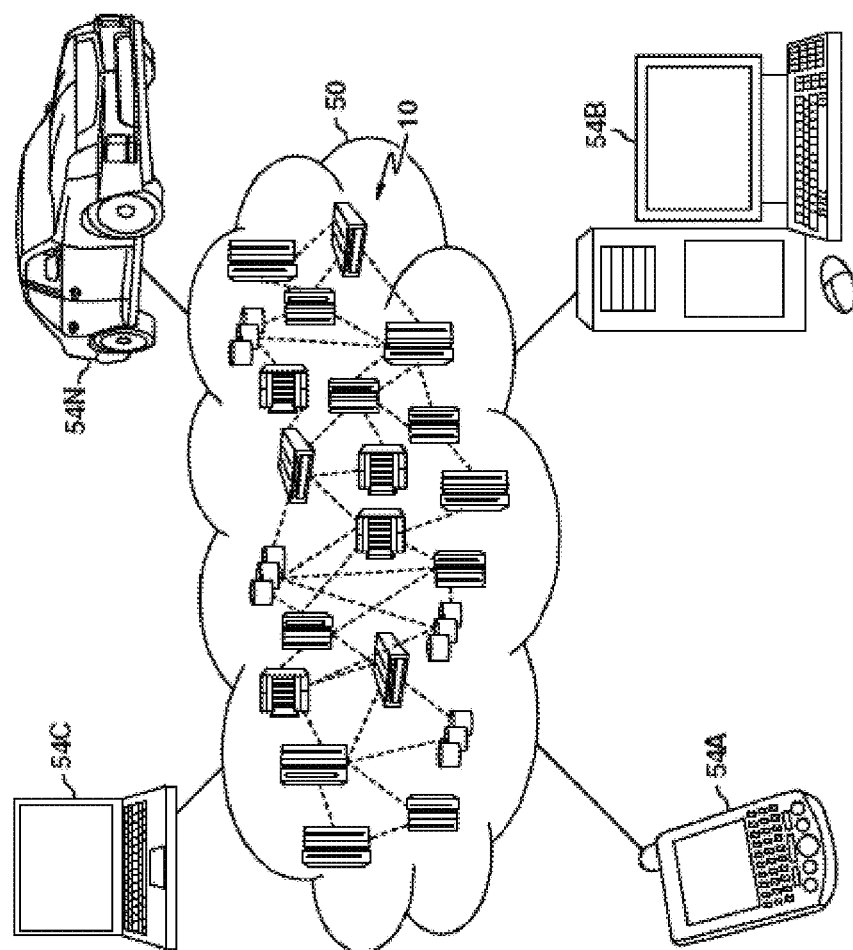
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
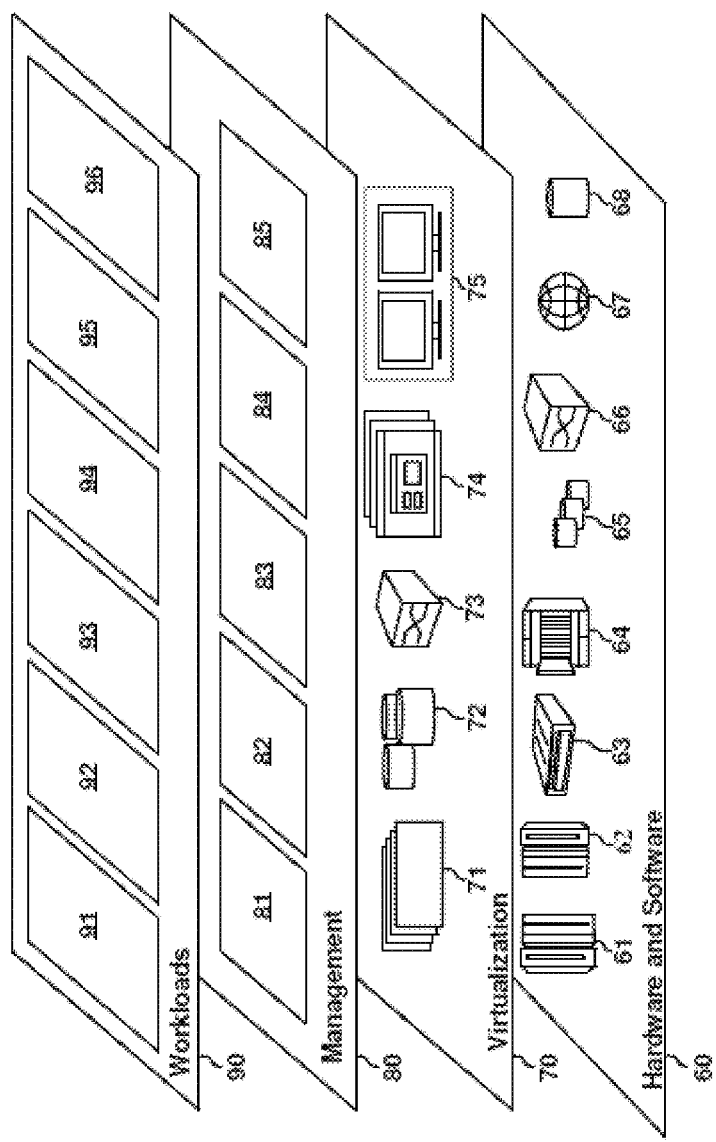
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Figure 3:
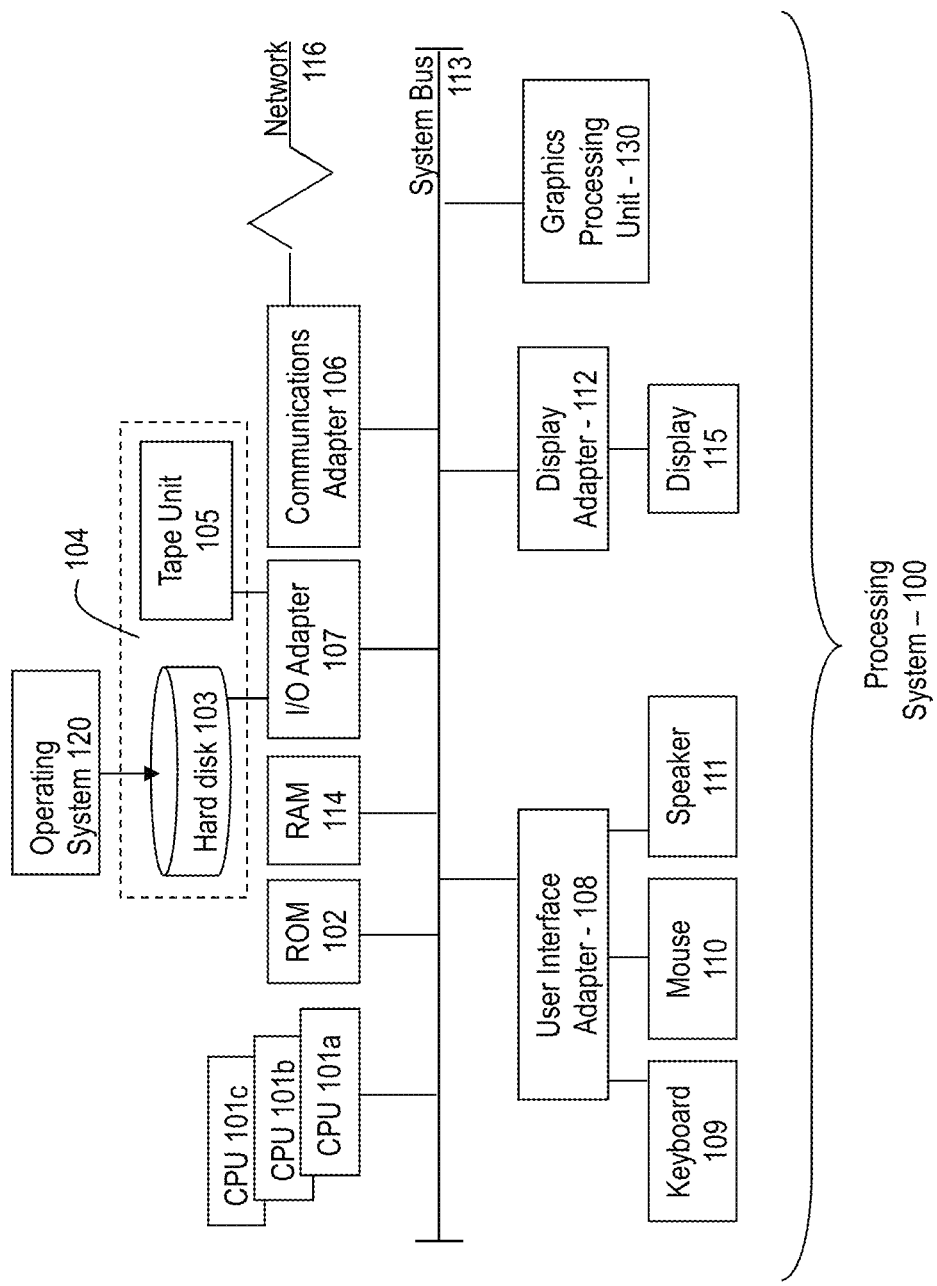
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Turning now to an overview of technologies that are more specifically relevant to aspects of the invention, chatbots are increasingly used to initiate and hold automated conversations with users of websites or software via chat messaging software, obviating the need for humans to respond at least at an initial stage to chat messages presented from users via the chat messaging software. As advances in natural language processing, computational linguistics, artificial intelligence, and machine learning make conversations between humans and chatbots more and more indistinguishable from conversations exclusively between humans, more needs can be satisfied by chatbots without requiring human intervention. As chatbots, however, handle more and more topics, the source code behind them becomes increasingly complicated and time-consuming for a developer to understand to allow a single instance of a chatbot to handle all of a diversity of topics. The CPU time and memory usage necessary to execute a single, complicated chatbot handling all of a diversity of topics is very high, leading to unnecessary resource utilization. A simple chatbot that handles only one or a small number of topics may allow the source code behind it to be much less complicated, as well as less resource intensive to execute. Presented are a method, a system, and a computer program product for using a plurality of chatbots to each handle user messages presented in an efficient manner.

"Chat messages" as discussed herein refer to text-based, vocal, or image-based messages transmitted in real-time via chat messaging software over any sort of network (such as the internet) between a sender and a receiver. All specific types of chat messaging software, as well as all software protocols for sending and receipt of chat messages are contemplated for usage with the presently disclosed invention. In the situation that received chat messages are vocal in nature (i.e., spoken via human voice), speech recognition software serves to parse the vocal messages into text-based messages for further processing as discussed below. Alternately, if transmitted chat messages are text-based in nature, text-to-speech software may serve to convert text-based messages to vocal, as needed.

Virtual assistants are commonly used to collect information from an end user to obtain more specific answers (informational) or to complete a transaction (transactional). An example is collecting a user's billing and shipping information to purchase a product. In today's environment, virtual assistants have two main approaches for collecting information from the user, an open conversation driven-type virtual assistant, and a form driven-type virtual assistant.

Open-conversation driven type virtual assistants can prompt the user with specific questions. For example, the virtual assistant may prompt the user, "Would you like to open a checking or savings account?" The user may respond "Checking." However, when a user responds with an unexpected answer such as "How many checking accounts can I open?" issues in the workflow may arise. A human would be able to answer the question and then proceed to ask the original question again, but a chatbot may face challenges in responding to the user.

Another type of virtual assistant includes a form-field type virtual assistant. This type identifies what the user wants to accomplish such as "Open a checking account" and then takes the user to a traditional form-driven user-interface (UI) to fill in the correct information. The interface can provide fields for the user to provide information such as their name, address, etc. However, this limits the user's experience and doesn't allow them to ask any clarifying questions like, "How many checking accounts can I open?" as in the previous scenario. The form-driven type of virtual assistant does not allow for the conversation to naturally flow. In addition, in some transactional flows, the user is unable to make changes to fields that were previously filled and if the user needs to visit a previous stage in the flow, their progress is not maintained.

The chatbot interacts with users in a conversational manner using an avatar and text message like interface design. Users can use free-form text to describe the task they want to complete. However, once a task has begun, users are no longer able to enter any text other than the specific choices offered, unless they choose to abandon the task and lose any progress. This prevents users from asking clarifying questions, or effectively taking advantage of the value of a virtual assistant to understand natural language.

Conventional techniques also use virtual assistants that transfer the task to be managed by a third-party application or another virtual assistant, where the form-type loses the conversational experience for inputting information. In addition, the form-type does not allow the user to ask additional clarifying questions because users are limited the form fields. As previously mentioned above, if the user leaves the current window with the form fields, the user's information is not maintained by the system and are, therefore, unable to navigate between multiple windows without losing progress or the data that has been entered into the form fields. By transferring the workflow, from the conversational format to the form format, the user is no longer able to interact in the free conversational form of the virtual assistant. The user is forced to select from the limited options presented by the application.

Turning now to an overview of the aspects of the invention, one or more embodiments of the invention address the above-described shortcomings of the prior art by providing techniques that allow the user to maintain the current state in the transaction and request clarifying information in a natural-language format at any point in the transaction.

Figure 4:
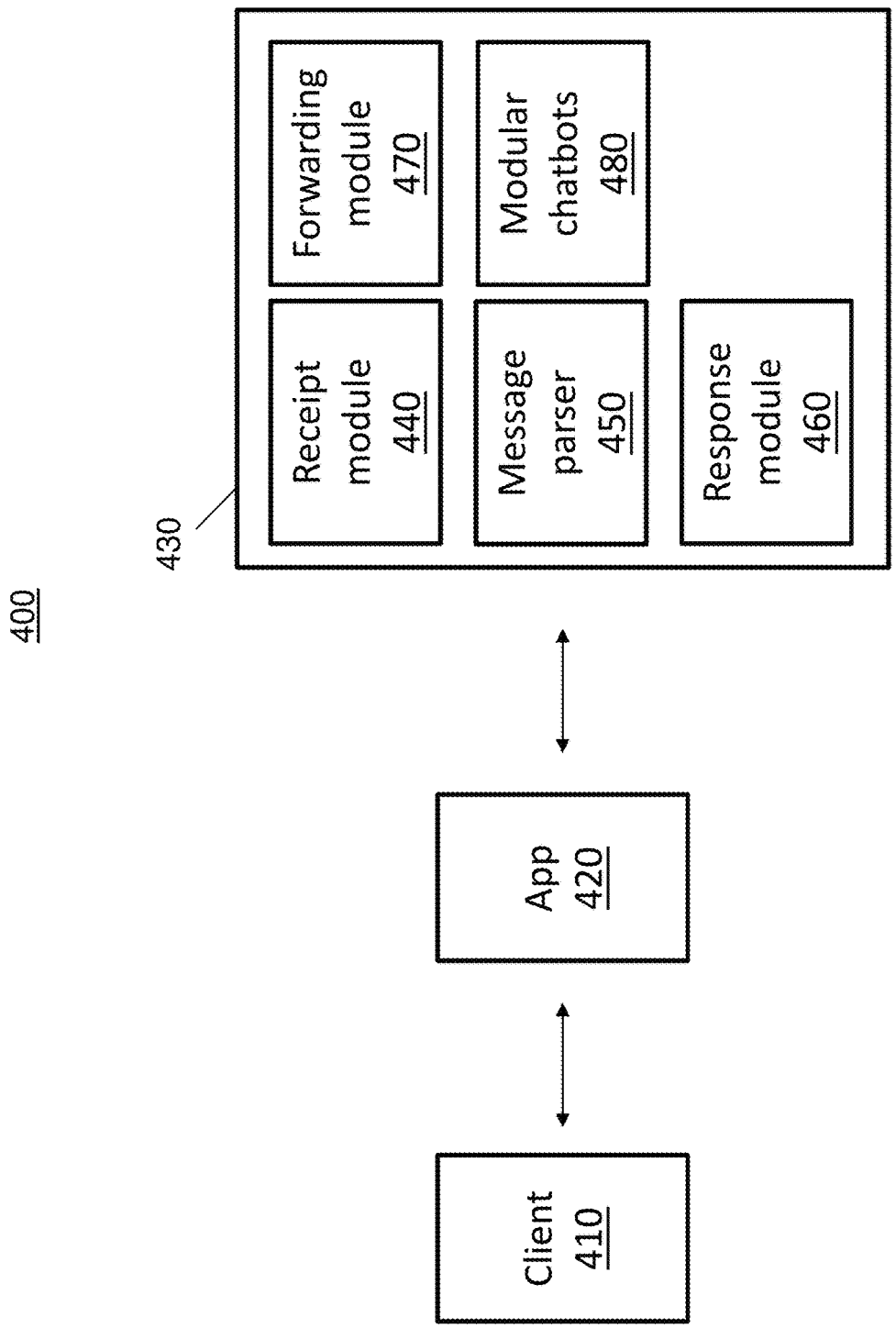
FIG. 4 depicts a system for providing capabilities for multi-threaded conversations within the same virtual assistant in accordance with one or more embodiments of the invention.

Turning now to a more detailed description of aspects of the present invention, FIG. 4 depicts a system in accordance with one or more embodiments of the invention. The system 400 receives inputs from the user and processes the received input. As shown in FIG. 4, a client 410 communicates with an application 420. The application 420 communicates with the chatbot server 430. In an embodiment, the chatbot server 430 includes a message receipt module 440, a message parser 450, a chatbot response module 460, and a message forwarding module 470.

Message receipt module 440 represents software and/or hardware installed on chatbot server 430 for receipt of chat messages transmitted from user client 410. Hardware associated with the message receipt module 440 may include a network adapter or interface. The chat messages are received by message receipt module 440 in computer-usable form and further processed by other functionality within chatbot server 430, as discussed.

Message parser 450 represents software for parsing chat messages received by the message receipt module 440 from the user client 410. The message parser 450 is generally responsible for electronically interpreting the subject of the chat messages. Natural language processing performs the necessary interpretations of the chat message into computer-usable form for further use herein. The message parser 450 utilizes natural language processing software to parse and understand each chat message (or multiple chat messages from the same user client 410 analyzed together). The natural language processing software may be rule-based in nature or based around a machine learning model. The natural language processing software may, in a preferred embodiment, extract intent and/or entities from each chat message (or group of chat messages) for later use. "Intent" includes purposes and/or goals expressed in each chat message or group of chat message's, including seeking an answer to a question or processing a bill payment. "Entities" include both entity types and entity subtypes which categorize a purpose of each chat message or group of chat messages. Examples of entities include, for example, anatomy, health condition, person, sport, etc. In the case of vocal messages received from the user client 410, message parser 450 utilizes speech recognition software to first parse the message into text for further processing, such as via the natural language processing software as discussed above and below.

Message parser 450 may also utilize natural language processing for parsing each chat message or multiple chat messages together for determining message type, message negation, and message sentiment. "Message type" may indicate, for example, that each chat message is a question, statement, definition, or exclamation. "Message negation" may indicate whether each chat message is negative. "Message sentiment" may indicate what sentiment is expressed in each chat message. Message sentiment may be obtained, for example, in the cast of text-based messages from software specialized to detect sentiment from parsed words, and in the case of voice messages from the parsed words themselves, as well as user tone, loudness, urgency, etc.

The chatbot server 430 and modular chatbots 480 each have specialty areas each is best at responding to, as well as other considerations including historical record of achieving satisfaction, present availability, and cost of access as further discussed below. That each of chatbot server 430 and modular chatbots 480 have unique specialties which streamlines design and maintenance of source code for each of the chatbot server 430. The chatbot server 430, for example, may be programmed to provide a wide variety of general information regarding a diversity of topics while each modular chatbot 480 may be programmed to provide more detailed information regarding a more limited range of topics, such as automotive knowledge, medical information, product inventory information, etc. with each modular chatbot having different artificial intelligence algorithms to tailored to the topics.

The response module 460 represents software and/or hardware for responding to chat messages forwarded to the modular chatbot 480. If a particular modular chatbot 480 is selected by the user interface for responding to a chat message, the modular chatbot 480 formulates an appropriate response, considering information parsed from the chat message by the message parser 450 utilizing natural language processing. The appropriate response is transmitted via text or voice to the user client 410. A chat module of the user client 410 may be utilized to further continue the chat conversation.

A message forwarding module 470 represents software and/or hardware for forwarding chat messages to modular chatbot 480 for response by the modular chatbot 480, if the response module 460 determines one of the modular chatbots 480 is most appropriate to respond to the chat message and the response module 460 does not directly respond to the chat message itself. The message forwarding module 470 automatically forwards the one or more chat messages to the most appropriate modular chatbot 480 for response to the user client 410. Alternately, if the user of user client 410 has been presented a list of modular chatbots 480 to respond to a chat message, and the user at user interface of user client 410 has selected a particular modular chatbot 480, the message forwarding module 470 forwards the message to that modular chatbot 480 for response.

Figure 5:
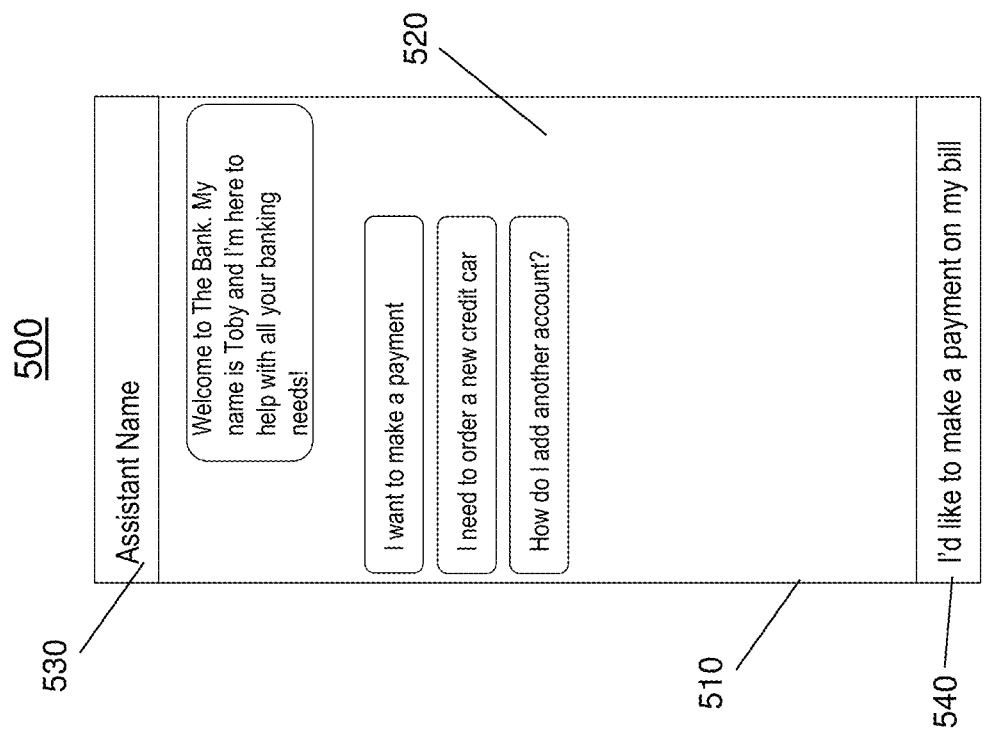
FIG. 5 depicts a display for providing capabilities for multi-threaded conversations within the same virtual assistant in accordance with one or more embodiments of the invention.

Now referring to FIG. 5 a display 500 of a user device is shown in accordance with one or more embodiments. The display 500 shows a user interface 510 for interacting with the virtual assistant, such as the chatbot server 430, in accordance with one or more embodiments. As shown, the user interface 510 includes a main conversation window 520 where the main conversation window 520 includes a history of the interaction between the user and the virtual assistant. The user interface 510 also includes a banner indicating the virtual assistant's name 530 and a chat message 540 where the user can provide an input to the virtual assistant.

In this non-limiting example, the user is presented with a number of banking transaction options in the main conversation window 520. The user is provided with the following options to choose from including: "I want to make a payment;" "I need to order a new credit card;" and "How do I add another account?"

The user can communicate with the automated system using the chat message 540. As shown in FIG. 5, the user has selected "I'd like to make a payment on my bill" in the chat message 540, and the input is analyzed using natural language processing by the system. The system has determined the first topic presented by the user and that the user would like to pay a bill. In one or more embodiments of the invention, the automated system will be capable of collecting variables from the user. For example, if the user indicates "I'd like to make a payment of $500.00 on my bill," upon entering the payment section of the process (described below) the variables for the payment amount and date can be pre-populated in those windows. It should be understood that the variables that are pre-filled are not limited to the example provided above but it can also be applied to other information such as billing/shipping addresses, names, payment accounts, etc.

Figure 6:
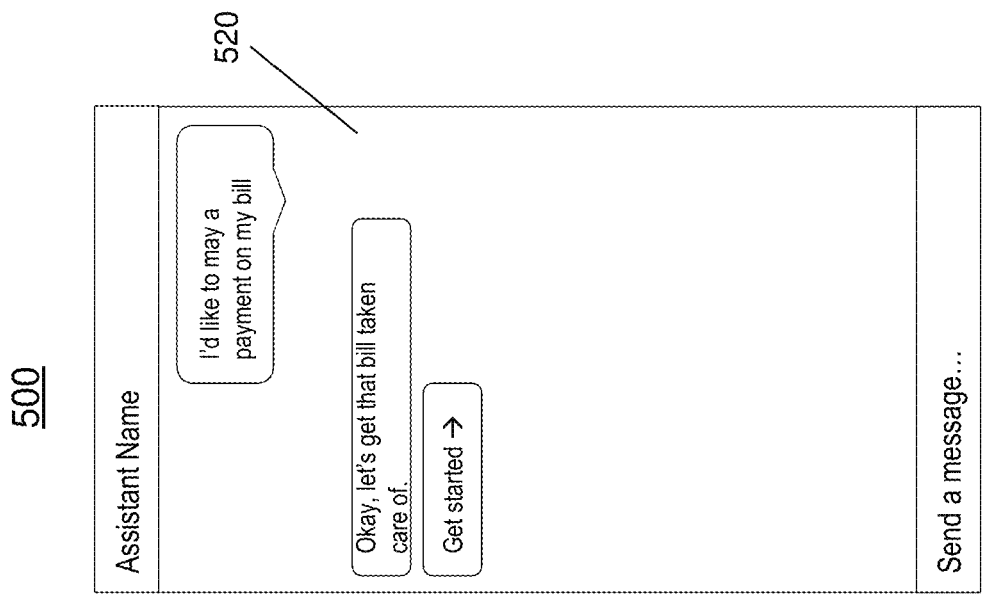
FIG. 6 depicts a display in accordance with one or more embodiments of the invention.

As shown in FIG. 6, the user's selection is displaying in the main conversation window 520. Also, the automated system acknowledged the user's selection stating "Okay, let's get that bill taken care of" and provides an option in the main conversation window 520 for the user to begin the payment process.

FIG. 7 illustrates responsive to the user starting the payment process, an information collection user interface 710 is triggered and begins to slide over the main conversation window 520. FIG. 8 depicts the information collection user interface 710 after it is overlaid on the main conversation window 520. The information collection user interface 710 asks the user which bill they would like to pay. In this example, the options include "Auto Insurance," "Credit Card," "Mortgage," and "Auto Loan."

Also shown in FIG. 8, the top banner 810 indicates the objective to be accomplished and during any time in the payment process the user can return to the main conversation window to ask a question before completing the transaction.

Figures 9, 10:
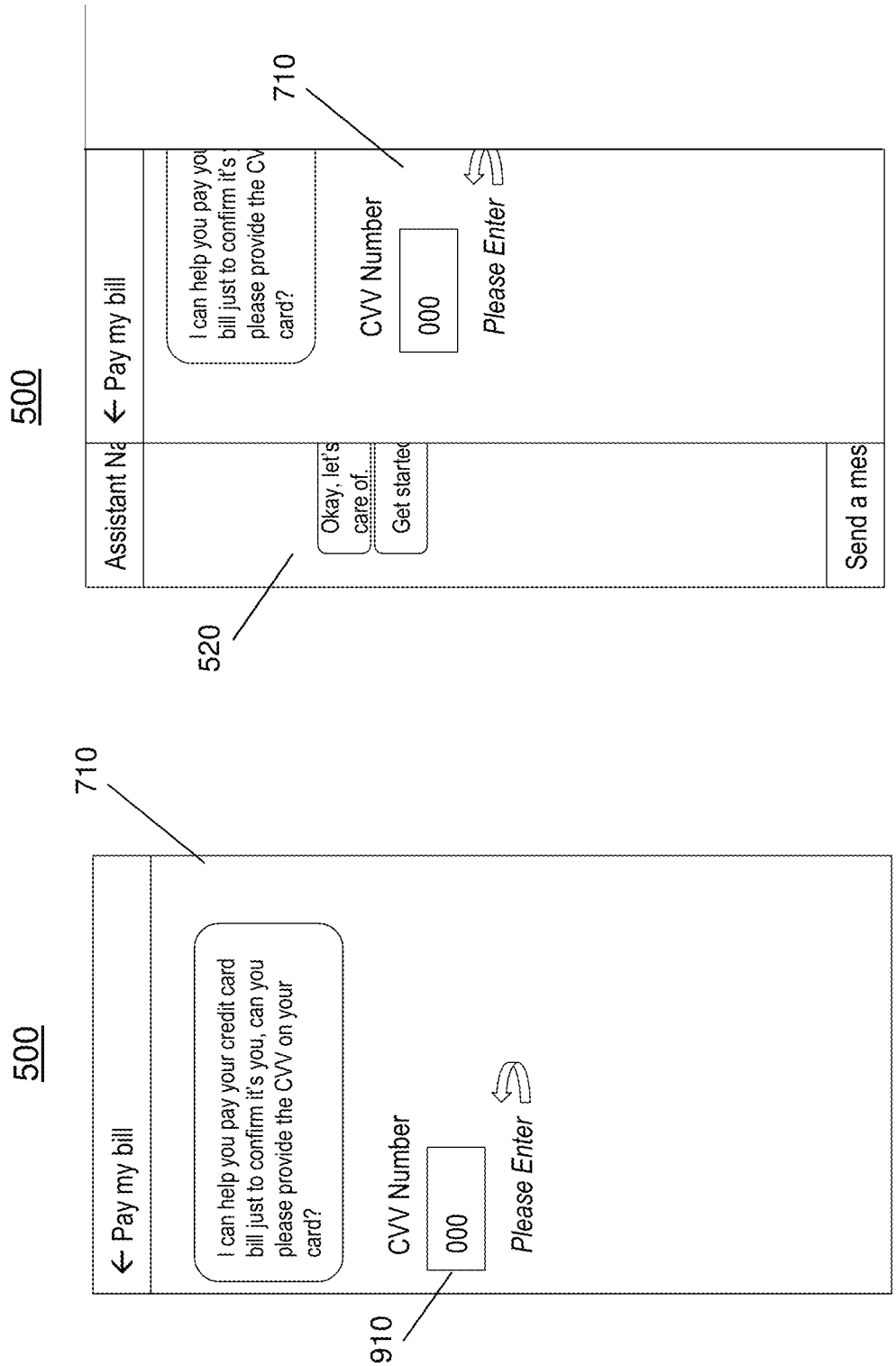
FIG. 9 depicts a display in accordance with one or more embodiments of the invention.
FIG. 10 depicts a display in accordance with one or more embodiments of the invention.

After the user makes a selection, in this case, the user has selected to make a payment on their "credit card," the information collection user interface 710 requests the CVV number of the credit card as shown in FIG. 9. The system acknowledges the user's selection. During the payment process, the user may be faced with one or more requests that may be unclear or unknown to the user. Also, the user may ask a question that may be relevant to the current request or a completely different topic about an issue they are experiencing. For example, the user may not know where to find their CVV number 910 on their credit card which is needed to complete the bill payment transaction. Conventional systems do not allow the user to ask questions at this stage of the process. In particular, the conventional systems do not allow users to input questions in a conversational manner and process the inquiry using NLP during the middle of the transaction without losing any progress made in the transaction. In one or more embodiments of the invention, the user can make a selection to return to the main conversation window 520 to ask a clarifying question.

FIG. 10 depicts the display 500 that is transitioning back to the main conversation window 520. The techniques described herein allow the user to make a selection to return to the main conversation window 420 and ask a clarifying question to the virtual assistant prior to completing the transaction.

Figures 11, 12:
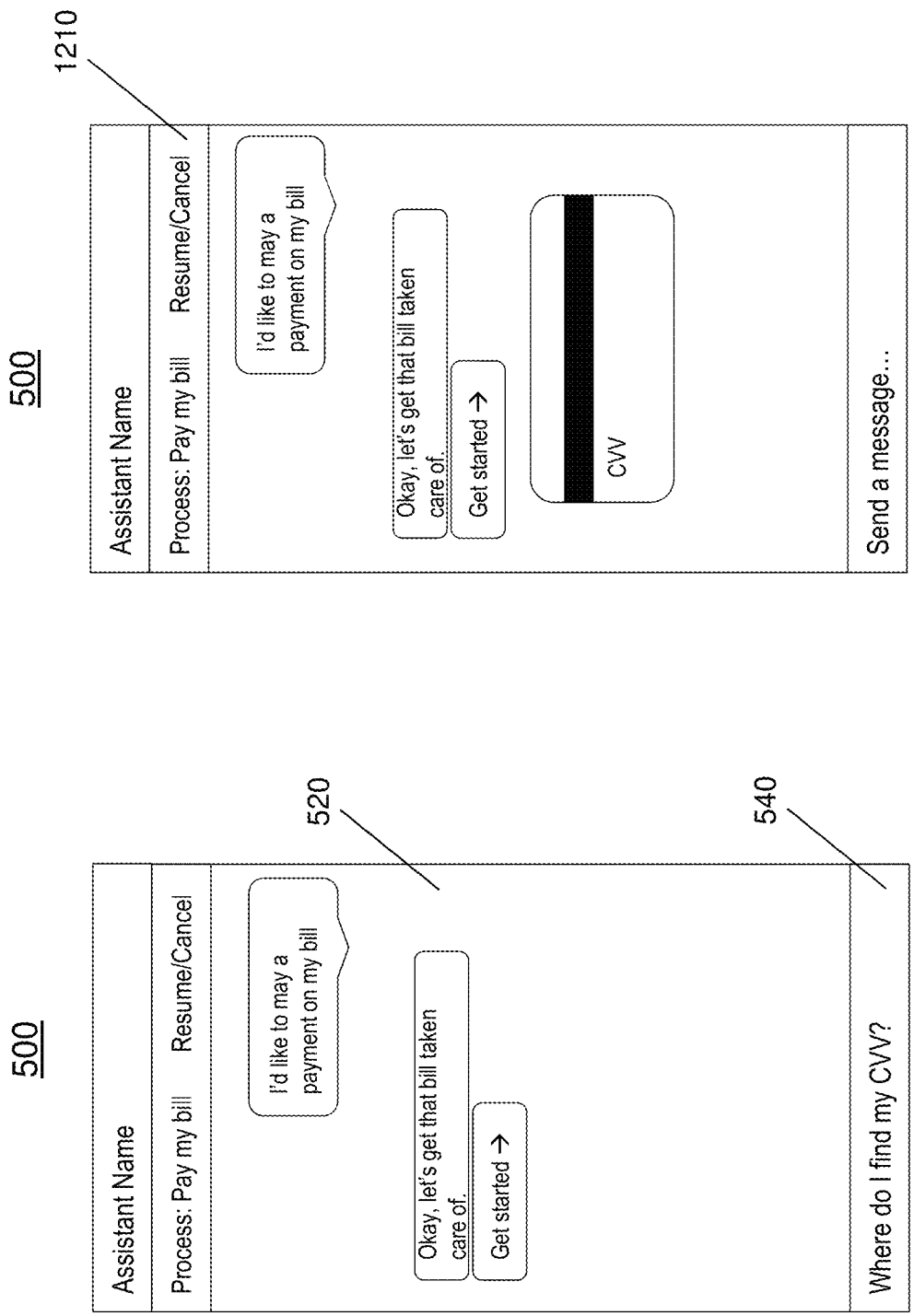
FIG. 11 depicts a display in accordance with one or more embodiments of the invention.
FIG. 12 depicts a display in accordance with one or more embodiments of the invention.

As shown in FIG. 11, the user inputs "Where do I find my CVV?" into the chat message 540. The second topic provided in the main conversation window 520 is related to locating the CVV on the credit card. In this case, the user is not limited to a number of options such as that provided in a frequently asked questions (FAQs) section. The user is given the capability to provide additional questions in a conversational format. The system is equipped with an NLP that analyzes the user's response.

In one or more embodiments of the invention, the main conversation window 520 maintains the history related to the previously discussed topics. It should be understood the main conversation window 520 is not limited to storing only the first topic but also any previously topics that have been input into the system.

FIG. 12 illustrates a second topic that is provided in the main conversation window. The system obtains the requested information from the server and displays the information in the main conversation window 520. As shown, information is provided by the virtual assistant in the main conversation window 520 identifying the location of the CVV on the credit card. In one or more embodiments of the invention, the user can provide further questions in a conversational format (i.e. third topic, fourth topic, etc.). If no further questions are provided from the user, the user can return to the information collection user interface 710 to resume the transaction by selecting the "Resume" option 1210 in the banner.

The information collection objective can also be determined by the system and displayed in the information collection user interface 710, and in this example, the information collection objective is "Pay my bill." It should be understood that this is only an example of the information collection object and is not intended to be limiting.

FIG. 13 illustrates the display 500 as it transitions back to the information collection user interface 710. After the user receives the information the user can return to the information collection user interface 710 and input the requested information to continue the payment. In this case, the user provides the CVV number "123" as shown in FIG. 14. The checkmark indicates that the system has validated the user's CVV number with the corresponding credit card.

FIG. 15 depicts a display 500 provides payment amount information to the user. After selecting the amount to be paid, the user selects to pay the "Total Balance—$1011.92," the user is prompted to select the payment date. In FIG. 16, the system prompts the user for a payment date. The user selects February 20, 2019 (02/20/2019) and confirms the payment by using the bottom banner 1710 shown in FIG. 17.

Figure 19:
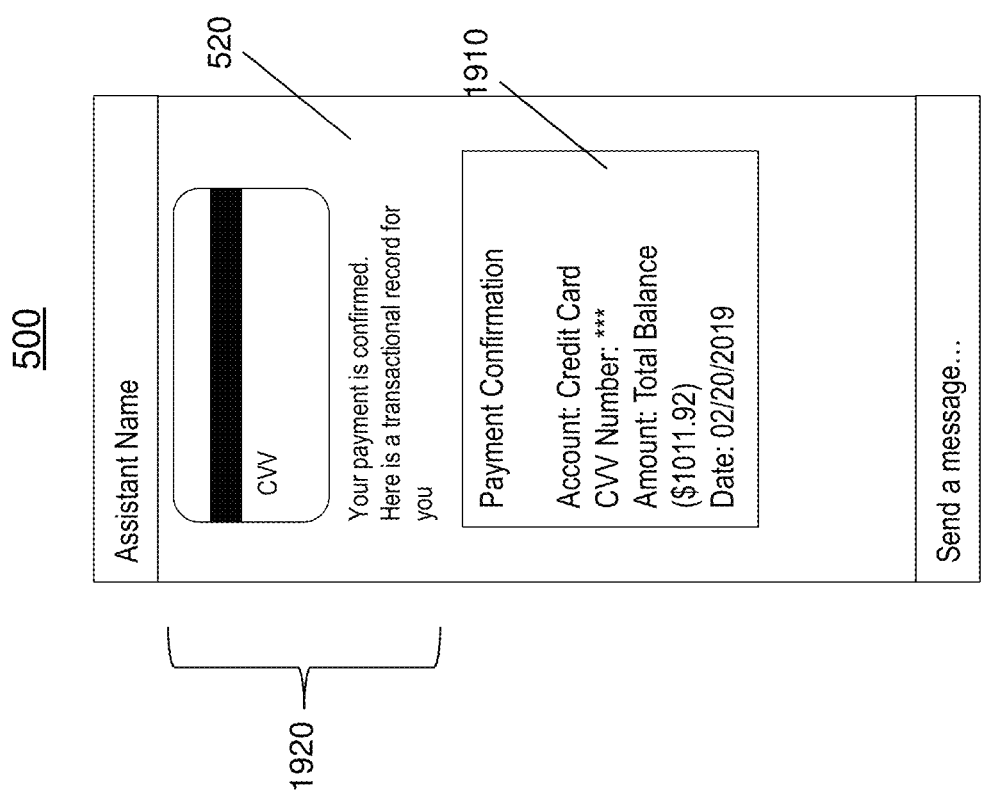
FIG. 19 depicts a display in accordance with one or more embodiments of the invention.

Finally, as shown in FIGS. 18 and 19 a summary 1810, 1910 of the transaction is provided in the information collection user interface 710 and the main conversation window 520, respectively. This allows the user to have a history of the transaction that is readily available in the main conversation window 520. As shown, the previous message providing the location of the CVV is maintained in the main conversation window 520.

As shown, the summary 1810, 1910 of both the information collection user interface 710 and the main conversation window 520 includes information related to the transaction indicating the payment account, the total balance, and the payment date. It should be understood that other information related to the transaction can be included in the summary. FIG. 19 also depicts the history 1920 of the previous topic in the main conversation window 520 are maintained for the user's convenience.

Figure 20:
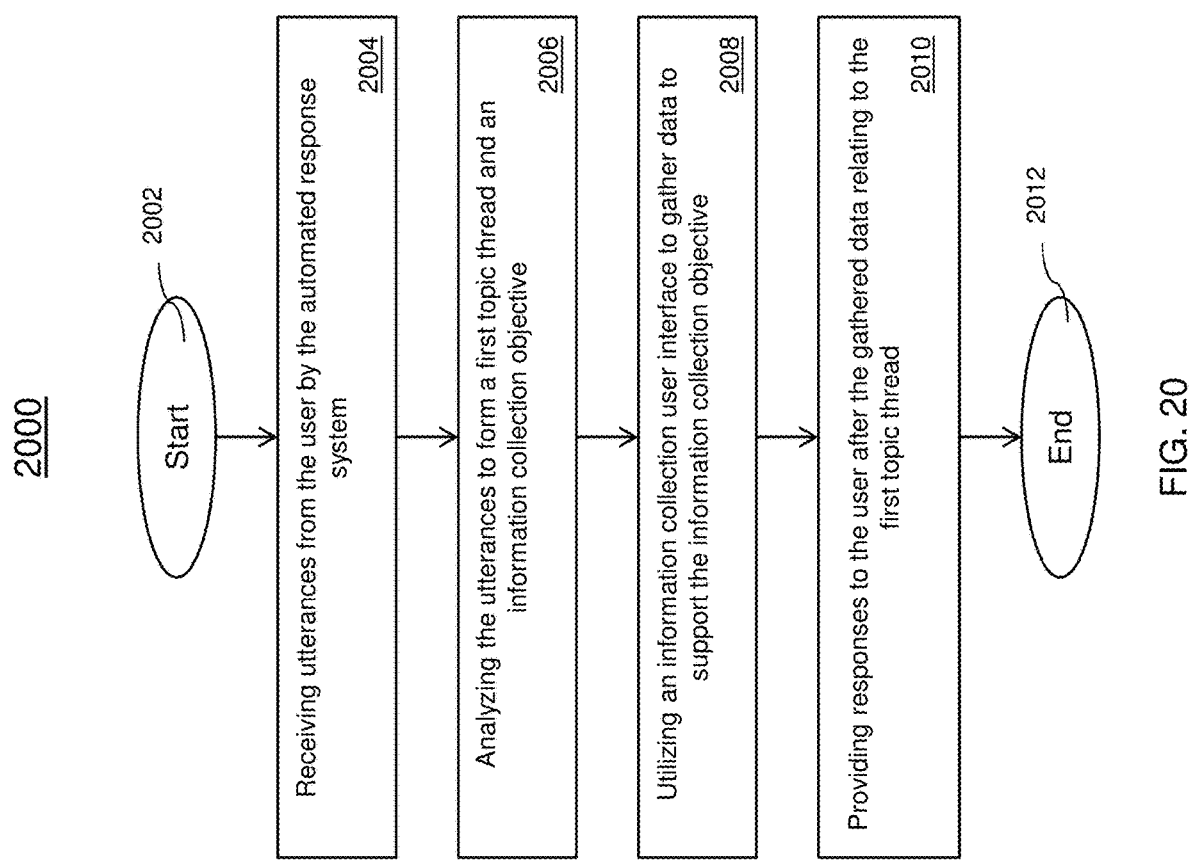
FIG. 20 depicts a flowchart of a method in accordance with one or more embodiments of the invention.

Now referring to FIG. 20, a flowchart of a method 2000 for providing capabilities for multi-threaded conversations within the same virtual assistant is shown. The method 2000 begins at block 2002 and proceeds to block 2004 which provides for receiving a plurality of utterances from the user by the automated response system. The utterances are statements that are provided from the user in a conversational format. In one or more embodiments of the invention, the automated response system is a chatbot. The chatbot is used to obtain information from the user.

At block 2006, the method 2000 provides for analyzing the utterances to form a first topic thread and an information collection objective. In one or more embodiments of the invention, the first topic is input in a chat message and displayed in a main conversation window. The automated system processes the utterances of the chat message. The information collection user interface is overlaid, when triggered, on the main conversation window to obtain information from the user where the user input is further processed by the system.

At block 2008 utilizing an information collection user interface to gather data to support the information collection objective. In one or more embodiments of the invention, the information collection user interface is overlaid on the main conversation thread and is triggered by an NLP process. In one or more embodiments, a user interface is provided to gather information from the user. The information collection objective can include transactions such as making a payment on a bill, obtaining customer service, or some other type of transaction. In some embodiments of the invention, the user can return to the main conversation window from the information collection user interface to ask additional questions for a second topic that is related to the first topic. Such scenarios include a user asking questions related to the process when an issue arises or is unclear in the information collection in the information collection user interface. The system will provide a second topic thread responses to the user for a second topic thread, and provide new responses to the user based on the first topic thread context after providing the second topic thread responses.

In one or more embodiments of the invention, the system provides the responses to the clarifying question prior to completing the transaction of the initial topic, because the user may be unable to complete the transaction without the information. For example, the user may need to know where to locate the CVV number for their credit card prior to completing a payment transaction where the payment is the first topic and the CVV for a credit card is the second topic that is related to the first topic.

At block 2010 providing responses to the user after the gathered data related to the first topic thread. In one or more embodiments of the invention, the system can complete the transaction for the first topic thread after gathering the needed information from the user. The method 2000 ends at block 2012. It should be understood that the steps of method 2000 are not intended to be limiting and that other steps can be within the scope of one or more embodiments of the invention.

In one or more embodiments of the invention, a user is given the capability to resume/pause an ongoing transaction to ask a clarifying question. The user is able to conversationally ask questions to the virtual assistant without being limited to a number of predetermined options. The transaction maintains its state so the user will not lose any progress once they return to complete the transaction after they obtain answers to their clarifying questions. In one or more embodiments of the invention, the user can go back to change their previous answers.

In other embodiments of the invention, a summary of the transaction is provided in the main conversation thread and the information collection user interface, which are under the control of the same virtual assistant. This allows the user to maintain a history of the transaction in the chat window of the virtual assistant for the convenience.

The technical effects and benefits include allowing a user to maintain a conversational experience with the same virtual assistant throughout a process. The techniques described herein do not pass the transaction or workflow to a form-driven type of application or web application and allows the user to ask clarifying questions to the virtual assistant at any point during the transaction.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for interacting with a user by an automated response system supporting topic switching and information collection comprising:
   receiving a plurality of utterances from the user by the automated response system;
   analyzing the utterances to form a first topic thread and an information collection objective;
   utilizing an information collection user interface to gather data to support the information collection objective;
   providing responses to the user after the gathered data related to the first topic thread;
   providing second topic thread responses to the user for a second topic thread;
   providing new responses to the user based on the first topic thread context after providing the second topic thread responses, wherein the first thread and the second thread are provided in a single main conversation thread, wherein the single main conversation thread is displayed on a user device and provides a history of an interaction between the user and a virtual assistant of the automated response system including the plurality of utterance and the first topic thread responses and the second topic thread responses;
   returning to the first topic thread from the second topic thread; and
   enabling a change to the gathered data related to the first topic thread, wherein the gathered data was previously entered in the first topic thread.

2. The computer-implemented method of claim 1, wherein the information collection user interface is triggered based on a natural language processing (NLP) analysis of the user utterances.

3. The computer-implemented method of claim 1, further comprising generating a summary for a completed transaction for the first topic in the main conversation thread and the information collection user interface.

4. The computer-implemented method of claim 1, further comprising selectively navigating between the information collection user interface and the main conversation thread.

5. The computer-implemented method of claim 1, wherein the information collection user interface is overlaid on the main conversation thread.

6. The computer-implemented method of claim 1, wherein the system processes the first topic and the second topic in parallel using a single virtual assistant.

7. A system for interacting with a user by an automated response system supporting topic switching and information collection, the system comprising:
   a user interface;
   a storage medium, the storage medium being coupled to a processor;
   the processor configured to:
   receive a plurality of utterances from the user by the automated response system;
   analyze the utterances to form a first topic thread and an information collection objective;
   utilize an information collection user interface to gather data to support the information collection objective;
   provide responses to the user after the gathered data related to the first topic thread;
   provide second topic thread responses to the user for a second topic thread;
   provide new responses to the user based on the first topic thread context after providing the second topic thread responses, wherein the first thread and the second thread are provided in a single main conversation thread, wherein the single main conversation thread is displayed on a user device and provides a history an interaction between the user and a virtual assistant of the automated response system including the plurality of utterance and the first topic thread responses and the second topic thread responses;
   return to the first topic thread from the second topic thread; and
   enable a change to the gathered data related to the first topic thread, wherein the gathered data was previously entered in the first topic thread.

8. The system of claim 7, wherein the information collection user interface is triggered based on a natural language processing (NLP) analysis of the user utterances.

9. The system of claim 7, further comprising generating a summary for a completed transaction for the first topic in the main conversation thread and the information collection user interface.

10. The system of claim 7, further comprising selectively navigating between the information collection user interface and the main conversation thread.

11. The system of claim 7, wherein the information collection user interface is overlaid on the main conversation thread.

12. The system of claim 7, wherein the system processes the first topic and the second topic in parallel using a single virtual assistant.

13. A computer program product for interacting with a user by an automated response system supporting topic switching and information collection, the computer program product comprising:
   a computer-readable storage medium having stored thereon program instructions executable by a processor to cause the processor to:
      receive a plurality of utterances from the user by the automated response system;
      analyze the utterances to form a first topic thread and an information collection objective;
      utilize an information collection user interface to gather data to support the information collection objective, wherein the information collection user interface is triggered based on a natural language processing (NLP) analysis of the user utterances; and
      provide responses to the user after the gathered data related to the first topic thread;
      provide second topic thread responses to the user for a second topic thread;
      provide new responses to the user based on the first topic thread context after providing the second topic thread responses, wherein the first thread and the second thread are provided in a single main conversation thread, wherein the single main conversation thread is displayed on a user device and provides a history of an interaction between the user and a virtual assistant of the automated response system including the plurality of utterance and the first topic thread responses and the second topic thread responses;
      return to the first topic thread from the second topic thread; and
      enable a change to the gathered data related to the first topic thread, wherein the gathered data was previously entered in the first topic thread.

14. The computer program product of claim 13, wherein the automated response system processes the first topic and the second topic in parallel using a single virtual assistant.

15. The computer program product of claim 13, further comprising generating a summary for a completed transaction for the first topic in the main conversation thread and the information collection user interface.

16. The computer program product of claim 13, further comprising selectively navigating between the information collection user interface and the main conversation thread without losing a current state.

* * * * *